(12) United States Patent
Chen

(10) Patent No.: US 11,038,179 B2
(45) Date of Patent: Jun. 15, 2021

(54) FLEXIBLE ENERGY STORAGE DEVICES

(71) Applicant: Tuqiang Chen, Albuquerque, NM (US)

(72) Inventor: Tuqiang Chen, Albuquerque, NM (US)

(*) Notice: Subject to any disclaimer, the term of this patent is extended or adjusted under 35 U.S.C. 154(b) by 317 days.

(21) Appl. No.: 16/374,198

(22) Filed: Apr. 3, 2019

(65) Prior Publication Data

US 2020/0321619 A1    Oct. 8, 2020

(51) Int. Cl.

| | | |
|---|---|---|
| *H01M 4/02* | (2006.01) |
| *H01M 4/74* | (2006.01) |
| *H01G 11/50* | (2013.01) |
| *H01M 4/66* | (2006.01) |
| *H01M 4/485* | (2010.01) |
| *H01M 4/587* | (2010.01) |
| *H01M 4/38* | (2006.01) |
| *H01M 4/36* | (2006.01) |
| *H01M 4/62* | (2006.01) |
| *H01G 11/78* | (2013.01) |
| *H01G 11/70* | (2013.01) |
| *H01G 11/56* | (2013.01) |
| *H01G 11/28* | (2013.01) |
| *H01G 11/68* | (2013.01) |
| *H01M 10/0525* | (2010.01) |
| *H01M 50/116* | (2021.01) |

(52) U.S. Cl.
CPC .............. *H01M 4/74* (2013.01); *H01G 11/28* (2013.01); *H01G 11/50* (2013.01); *H01G 11/56* (2013.01); *H01G 11/68* (2013.01); *H01G 11/70* (2013.01); *H01G 11/78* (2013.01); *H01M 4/364* (2013.01); *H01M 4/386* (2013.01); *H01M 4/485* (2013.01); *H01M 4/587* (2013.01); *H01M 4/622* (2013.01); *H01M 4/625* (2013.01); *H01M 4/661* (2013.01); *H01M 10/0525* (2013.01); *H01M 50/116* (2021.01)

(58) Field of Classification Search
CPC ...................................................... H01M 4/02
See application file for complete search history.

(56) References Cited

U.S. PATENT DOCUMENTS 9,905,370 B2    2/2018  Chen
2018/0123177 A1*  5/2018  Wang ................. H01M 4/0404

* cited by examiner

*Primary Examiner* — Jacob B Marks

(57) ABSTRACT

The invention discloses a flexible energy storage device that is primarily a Li-ion battery or a supercapacitor. The flexible device comprises a cathode and an anode, where layers of an electrode material, a polymer electrolyte, and a packaging material are coated with pattern on a metal mesh current collector. The cathodes and anodes are aligned and laminated, forming flexible energy storage devices. The composite structures of the device and the pattern of the materials coatings on metal mesh impart flexibility and foldability to the energy storage device.

10 Claims, 4 Drawing Sheets

FLEXIBLE ENERGY STORAGE DEVICES

STATEMENT REGARDING FEDERALLY SPONSORED R&D

None.

FIELD OF INVENTION

The invention relates to the field of energy storage devices, and primarily of Li-ion batteries and supercapacitors. More specifically, the invention relates to the field of flexible Li-ion batteries and supercapacitors required for flexible electronics.

BACKGROUND OF THE INVENTION

The advancement of flexible electronics has stimulated intensive efforts to search for corresponding energy storage devices that match their flexibility and bendability. Li-ion batteries are of great interest for development of flexible energy storage devices due to their high energy densities, layered cell structures, and possibly minimal amount of liquid involved. Supercapacitors, having high power densities and similar cell structures of Li-ion batteries, offer an alternative of flexible energy storage devices.

A plausible approach to flexible energy storage device is to develop flexible electrodes. Tremendous efforts have been given in this area, including development of flexible electrodes and polymer electrolytes of Li-ion battery or supercapacitor. The general idea for the development of flexible electrodes is having appropriate nanostructured active electrode materials embedded in or composited with a flexible substrate that may or may not be electrochemically active. For example, carbon nanotubes (CNTs), graphenes, carbon fibers, and carbon cloths have been used as the flexible substrates for making flexible Li-ion anodes and cathodes, as well as flexible supercapacitor electrodes. These flexible electrodes do improve device flexibility; however, with significant limitation. The flexible electrodes are typically stacked and folded to form a device. There is not sufficient adhesion between electrode layers to avoid delamination when devices are bent or folded repeatedly. New approaches to fabrication flexible Li-ion batteries or supercapacitors, including lamination, vacuum infiltration, coating, winding, or printing, have been investigated to form flexible energy storage devices of various configurations; however, none of them seem to be viable for large scale mass production.

In recent years, efforts have been made to improve performances of Li-ion batteries and supercapacitors involving utilization of metal mesh instead of metal foil as current collectors. Shi, et al. reported in a research article (Nano Energy, 2014, 6, 82-91) a flexible supercapacitor, prepared by deposition of carbon materials on stainless steel (SS) mesh, followed by assembly of a pair of mesh electrodes sandwiching a separator that is wetted with an organic electrolyte. Unfortunately, due to lack of sufficient adhesion between electrodes and separator, repeated bending may lead to failure of the supercapacitor due to layer separation. Chen disclosed the 3-D Li batteries and supercapacitors in a US patent (U.S. Pat. No. 9,905,370), where ultrafine metal mesh (UMM) was used as current collector. Thin films of electrode materials and solid state electrolytes were sequentially deposited onto the surfaces of the ultrafine metal mesh wires, forming UMM-based electrodes. The UMM-based anodes and cathodes were alternately stacked and laminated using the electrolyte as adhesive, forming mesh-based 3-D energy storage devices for better electrochemical and mechanical performance characteristics. The metal mesh substrates along with the laminated coating structures of the electrode materials and polymer electrolytes, forming a micro-composite structure, impart certain degrees of flexibility to the 3-D Li-ion batteries and supercapacitors; however, insufficient for substantial folding or bending.

These mesh-based electrodes, compared with conventional foil-based electrodes, allow loading of more electrode materials for improved performance characteristics due to higher porosity of mesh. These include higher energy and power densities. Additionally, a mesh substrate, having pore structures and high surface area, promotes better bonding between electrode materials and the substrate. The novel structures of mesh-based energy storage devices disclosed in the US patent (U.S. Pat. No. 9,905,370) also allow significant improvement over device flexibility, because the energy storage device is a metal wire reinforced composite having a continuous polymer electrolyte matrix. This improves flexibility and reduces risk of delamination upon bending or folding. However, it must be realized that polymer electrolytes are not intended for structural applications, they may not have the mechanical strength to withstand repeated bending or folding of a flexible device. Therefore, additional features of the flexible energy storage devices need to be introduced. Owing to the open structure of the metal mesh, the flexibility and foldability may be improved significantly, if a flexible packaging material is introduced as the continuous, well distributed matrix phase of the mesh-based energy storage device.

SUMMARY OF THE INVENTION

These and other objectives are achieved in the present invention by 1) utilization of a metal mesh as current collector, 2) deposition of an electrode and electrolyte coatings sequentially on metal mesh wires with desired patterns, producing mesh-based anode and cathode, and 3) lamination of well-aligned anodes and cathodes assembly with polymer electrolyte and polymer packaging materials as adhesive, and infiltration of the flexible packaging material into the open pores of the assembly, forming flexible energy storage devices of primarily Li-ion batteries and supercapacitors.

Accordingly, it is an object of the present invention to claim a flexible, foldable energy storage device by sequential deposition of patterned electrode material, electrolyte, and flexible packaging material on a flexible metal mesh substrate, followed by alignment, lamination, and/or infiltration of packaging material into the mesh-based anode and cathode assembly. It is another objective of the invention to further disclose the flexible energy storage device with features for folding and flexing abilities. There is at least one primary linear strip of flexible packaging material phase in the device, where metal mesh is embedded, which facilitates folding of the claimed energy storage device along the strip axis. There are two sets of parallel secondary strips of packaging material phase in the device, where metal mesh is embedded. The two sets of parallel strips interest at an angle, preferably 90°, defining numerous squares for additional device flexibility.

BRIEF DESCRIPTION OF THE DRAWINGS

The principle of the present invention may be understood with reference to the detailed description, in conjunction with the accompanying drawings, in which.

DETAILED DESCRIPTION OF THE INVENTION

Figure 1:
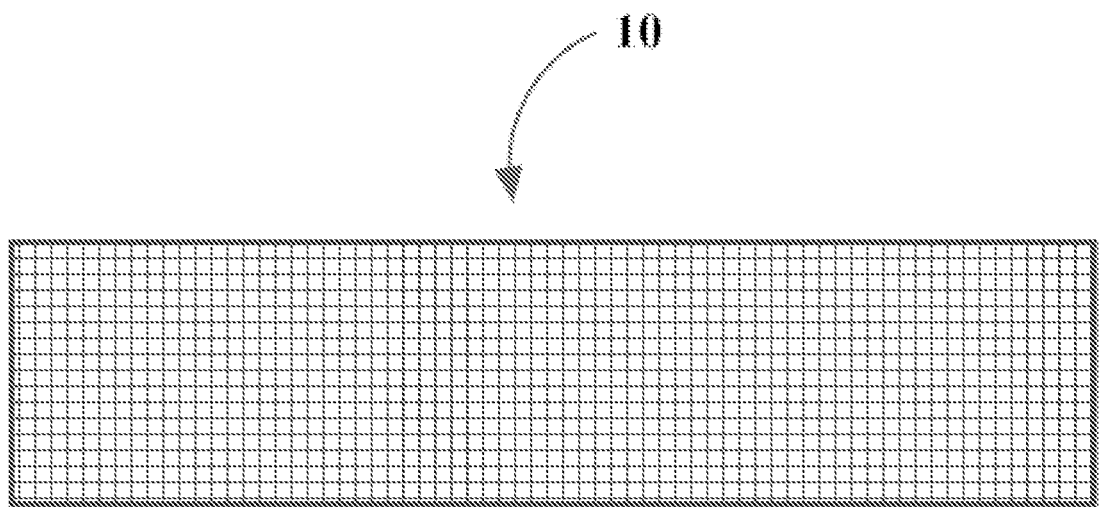
FIG. 1 shows a plan view of a metal mesh current collector.

Referring now to FIG. 1 of the drawings, is metal mesh 10 used as the energy storage device current collector and substrate for conducting current and for structural flexibility. Any suitable metals may be used for metal mesh 10, with Al, Cu, Ni, Sb, Cr, Fe, or Si as an example. The mesh wire diameter and mesh pore/opening size may range, for example, from 10 to 100 microns.

Figure 2:
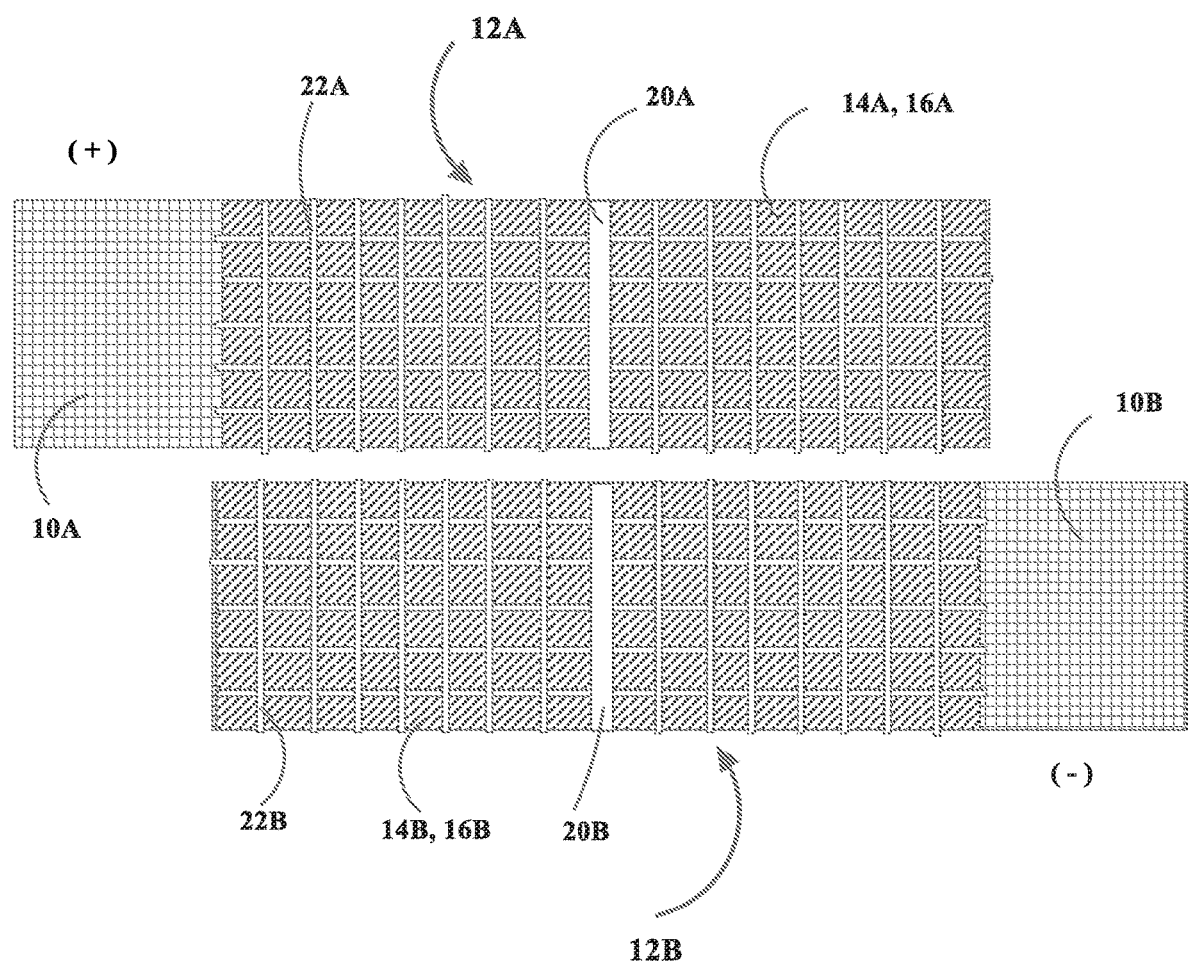
FIG. 2 shows a plan view of a pair of mesh-based electrodes.

Referring to FIG. 2 of the drawings, a pair of mesh electrodes, 12A for cathode and 12B for anode, comprise mesh substrate 10 (10A for cathode and 10B for anode), electrode coatings 14A and 14B, electrolyte coatings 16A and 16B, primary packaging strips 20A and 20B, and secondary strips 22A and 22B. The electrode (cathode or anode) layers 14 are directly coated on metal mesh wires, while electrolyte 16 is subsequently coated on electrode layer. The packaging strips 20 and 22, where metal mesh is embedded without electrode and electrolyte coatings. There is at least one wider, primary packaging strip 20, where mesh is embedded, that allows the device to fold along the strip axis; there are two sets of parallel secondary strips 22 that intersect to define numerous squares or other shapes of quadrilaterals, for improved device flexibility. It is worth noting that the edges of the mesh square may also be coated directly with packaging material 20, or left uncoated for final enclosing of the anode/cathode assembly with the packaging material.

Figure 3:
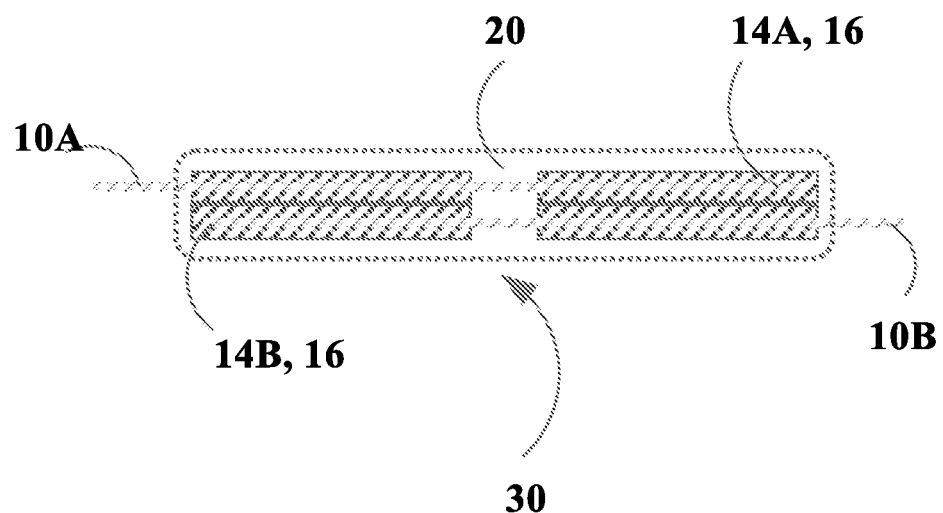
FIG. 3 illustrates a plan side view of the mesh-based flexible device.

Referring to FIG. 3 of the drawings, mesh based energy storage device 30 comprises mesh cathode 12A and mesh anode 12B, which are aligned, laminated and enclosed in packaging material 20. The lamination is achieved by cohesions of polymer electrolyte layers and packaging material layers and by adhesion of polymer electrolyte and packaging material. The flexible device may also be achieved by lamination of the electrode pair using the electrolyte as adhesive, followed by infiltration of the flexible polymeric packaging material into the well aligned pore structures. The primary strip/bar comprises highly flexible, foldable metal mesh embedded in the matrix of highly flexible packaging material. The secondary strips of packaging/mesh, not shown in the drawing, provide additional flexibility. It is worth noting that cohesions of the electrolyte and the packaging material eliminate the interfaces between the anode and cathode, which make the device an integral composite object.

Figure 4:
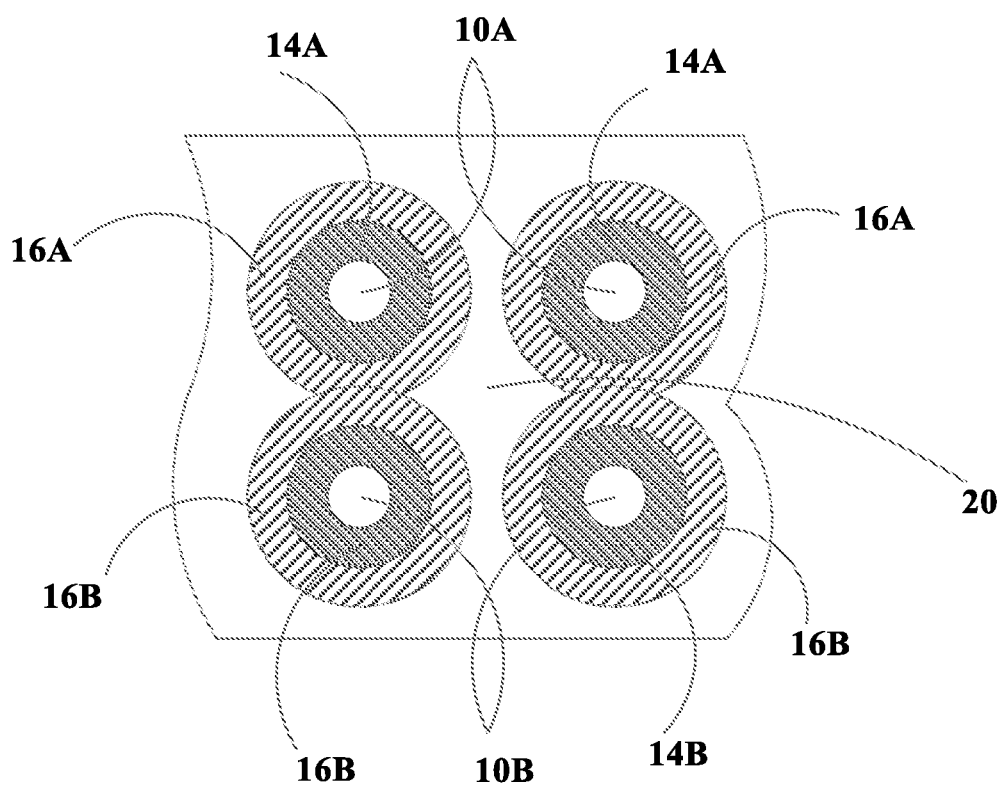
FIG. 4 shows a cross-sectional side view of adjacent coated mesh wires, illustrating detailed structural relations of mesh wire, coatings of electrode and electrolyte, and packaging material.

Referring to FIG. 4 of the drawings, flexible device 30 shows detailed structure features of two pairs of adjacent metal wires of anode and cathode with cylindrical electrode coating (14A and 14B) and electrolyte coating 16, embedded in the packaging material matrix 20. The mesh electrodes are packed in a pattern that the mesh wires of the cathode and the anode are perfectly aligned and bonded, which, however, does not exclude other packing patterns of the mesh-based electrode assembly in the invention. The thickness of the electrode and electrolyte coatings may be sufficiently small to not completely block the mesh openings, subsequently allowing packaging material to fill in.

Similar to the previously disclosed 3-D mesh-based energy storage devices (Chen, U.S. Pat. No. 9,905,370), the electrode coatings adhere more strongly to metal wire surfaces than they do to metal foil. This is because coatings on mesh wires have a closed structure and mesh has higher surface area than foil. Likewise, subsequent electrolyte coatings are bonded more strongly on the cylindrical electrode coatings. This is a great attribute for flexible electrodes, as the strong adhesions of the coatings significantly hinder delamination between these layers resulting from repeated bending or folding. By cohesion of the polymer electrolyte layers, it lead to a great lamination between the electrodes, resulting in a flexible device of a metal wire/fiber reinforced polymer composite. However, it must be realized that polymer electrolytes are not intended for structural applications; they may not have the mechanical strength to withstand repeated bending or folding of a flexible device. Therefore, additional features of the flexible energy storage devices are introduced in the present invention.

Compared with the previously disclosed 3-D mesh-based energy storage device (Chen, U.S. Pat. No. 9,905,370), the present invention discloses additional features for added flexibility and foldability. These features include 1) a flexible, continuous matrix of polymeric packaging, enclosing the anode/cathode assembly, 2) a primary folding strip in the middle of the device comprising the polymeric packaging material matrix embedded with metal mesh sheets, 3) two sets of parallel secondary flexing strips distributed in the entire device, and 4) open pores of mesh not fully covered with electrode and electrolyte materials allowing the flexible polymeric packaging material to fill in.

It is noted that introduction of these features, while improves flexibility, it reduces loading of active electrode materials, thus lowering device energy and power densities. It is therefore not necessary to include all these four features in the invention for a particular application. Furthermore, as the size of the mesh openings is small, mostly in the range of several tens of microns, it may be difficult to leave the holes open after applying electrode and electrolyte coatings. In this case, it may be essential to have the secondary flexible polymeric packaging strips in place to ensure added flexibility.

Li-ion batteries, as energy storage devices, commonly use a metal oxide as cathode and a carbon material as anode. Any suitable Li-ion battery cathode materials may be used to coat on the metal mesh current collector, with $LiCoO_2$, $LiNiO_2$, $LiMn_2O_4$, $LiFePO_4$, or $LiNi_xCo_yMn_z$, as an example. Such materials in powder form may be mixed with a conductive additive, a polymer binder with a solvent to form slurry, which may be applied onto the surface of mesh wires. The relative proportions of active material, conductive additive, and polymer binder may range, for example, from 50 wt % to 90 wt % of active material, and 0 wt % to 15 wt % of conductive additive, the balance being polymer binder. The cathode materials may also be deposited onto the surface of the mesh wires by other coating methods including wet chemical, vapor, or electrochemical techniques. The cathode coatings on mesh wire surface may not cover the mesh holes fully, and the thickness of cathode coatings may range, for example, from 2 microns to 200 microns.

Any suitable Li-ion anode material may be used in the invention, with graphite, Si, or LiTiO as an example. Such materials in powder form may be mixed with a conductive additive, a polymer binder with a solvent to form slurry, which may be applied onto the surface of mesh wires. The relative proportions of active material, conductive additive, and polymer binder may range, for example, from 50 wt % to 90 wt % of active material, and 0 wt % to 15 wt % of conductive additive, the balance being polymer binder. The anode materials may also be deposited onto the surface of the mesh wires by other coating methods including wet chemical, vapor, or electrochemical techniques. The anode coatings on mesh wire surface may not cover the mesh holes fully, and the thickness of the anode coatings may range, for example, from 2 microns to 200 microns.

A polymer or gel polymer electrolyte may be deposited on top of the Li-ion cathode or anode electrode coatings. Any suitable polymer electrolytes may be used in the invention. The polymer electrolyte may be deposited in a number of ways including cast, dip, spin, spray, or other coating techniques. The thickness of the polymer electrolyte coatings may range, for example, from 2 microns to 200 microns.

Supercapacitors, also called ultracapacitors or electrochemical double layer capacitors, as energy storage devices, use high surface area carbon as electrode materials. These include activated carbons, carbon nanotubes, graphenes, as well as pseudo-capacitance metal oxides such as $RuO_2$, NiO, and $IrO_2$. Such materials in powder form may be mixed with a conductive additive, a polymer binder with a solvent to form slurry, which may be applied onto the surface of mesh wires. The relative proportions of "active materials" and polymer binder may range, for example, from 50 wt % to 95 wt % of active material, the balance being polymer binder. The supercapacitor electrode materials may also be deposited onto the surface of the mesh wires by other coating methods including wet chemical, vapor, or electrochemical techniques. The electrode coatings on mesh wire surface may not cover the mesh holes fully, and the thickness of cathode coatings may range, for example, from 2 microns to 200 microns.

A polymer or gel polymer electrolyte may be deposited on top of the supercapacitor coatings. Any suitable polymer electrolytes may be used in the invention. The polymer electrolyte may be deposited in a number of ways including cast, dip, spin, spray, or other coating techniques. The thickness of the polymer electrolyte coatings may range, for example, from 2 microns to 200 microns.

A flexible polymeric packaging materials may be used to enclose and/or infiltrate the laminated anode/cathode assembly. Any suitable flexible polymeric materials may be used to enclose the device, with polysiloxane, polyurethane, polyester (PET), polyimide (PI), polyethylene naphthalate (PEN), polyetherimide (PEI), and fluropolymers or copolymers as an example. The thickness of the flexible polymer packaging layer may range, for example, from 2 microns to 2 mm. It is worth noting that the packaging material infiltrates into all the porous structures of the primary folding strips, the secondary flexing strips, the unblocked mesh holes, and the uncoated edges of the mesh substrate square, which bonds the mesh-based anode and cathode assembly strongly and makes them into an integral composite object.

What is claimed:

1. A flexible energy storage device comprising: a) at least one cathode, b) at least one anode, and c) a pair of flexible polymer packaging layers enclosing said cathode and anode, wherein said cathode comprising: a metal mesh current collector; a cathode material layer on said metal mesh wire; and a solid electrolyte layer on said cathode material layer; wherein said anode comprising: a metal mesh current collector; an anode material layer on said metal mesh wire; and a solid electrolytes layer on said anode material layer; wherein said solid electrolyte layers of cathodes and anodes are bonded together by themselves; wherein said polymer packaging layers bonded to said solid electrolyte layers; and wherein said packaging layers bonded to themselves through well-aligned open pore structures of said cathodes and anodes.

2. The flexible energy storage device of claim 1, wherein said open pore structures comprising voids of each mesh openings not fully filled with electrode and electrolyte materials.

3. The flexible energy storage device of claim 1, wherein said open pore structures comprising at least one primary linear strip of bare metal mesh with strip width ranging from 10 µm to 10 mm.

4. The flexible energy storage device of claim 1, wherein said open pore structures comprising two sets of secondary linear parallel strips of bare metal mesh that intersect with strip width ranging from 5 µm to 5 mm, and distance between adjacent strips ranging from 5 µm to 10 mm.

5. The flexible energy storage device of claim 1, wherein said metal mesh current collector comprising: a material selecting from the group consisting of Al, Cu, Ni, Sb, Cr, Fe, and Si, having a wire diameter ranging from 10 microns to 1,000 microns, and a mesh pore size ranging from 10 microns to 2000 microns.

6. The flexible energy storage device claim 1, wherein said cathode material layer comprising: a Li-ion cathode active material, a conductive additive, and a polymer binder, wherein said active material comprising a material selecting from the group consisting of S, $LiCoO_2$, $LiNiO_2$, $LiMn_2O_4$, $LiFePO_4$, and $LiNi_xCo_yMn_z$; said conductive additive comprising a material selecting from the group consisting of graphite and carbon black; and said polymer binder comprising a material selecting from the group consisting of PVDF, EPDM, CMC, PTFE and SBR; and wherein said cathode material layer has a thickness ranging from 2 microns to 200 microns.

7. The flexible energy storage device of claim 1, wherein said anode material layer comprising a Li-ion anode active material, a conductive additive, and a polymer binder, wherein said active material comprising a material selecting from the group consisting of LiTiO, graphite, and silicon, said conductive additive comprising a material selecting from the group consisting of graphite and carbon black, and said polymer binder comprising a material selecting from the group consisting of PVDF, EPDM, CMC, PTFE and SBR, and wherein said anode material layer has a thickness ranging from 2 microns to 200 microns.

8. The flexible energy storage device of claim 1, wherein said cathode and anode material layer comprising: a supercapacitor material, a conductive additive, and a polymer binder, wherein said supercapacitor material comprising a material selecting from the group consisting of activated carbon, graphene, carbon nanotubes, and pseudo-capacitive metal oxide, said conductive additive comprising a material selecting from the group consisting of graphite and carbon black, and said polymer binder comprising a material selecting from the group consisting of PVDF, EPDM, CMC, PTFE and SBR, and wherein said cathode material layer has a thickness ranging from 2 microns to 200 microns.

9. The flexible energy storage device of claim 1, wherein said solid electrolyte layer comprising a polymer electrolyte material, and wherein said electrolyte layer has a thickness ranging from 2 microns to 200 microns.

10. The flexible battery of claim 1, wherein said flexible polymer packaging layer comprising a material selecting from the group consisting of polysiloxane, polyurethane, polyester (PET), polyimide (PI), polyethylene naphthalate (PEN), polyetherimide (PEI), and fluropolymers and copolymers, and wherein said flexible polymer packaging layer has a thickness ranging from 2 microns to 2 mm.

\* \* \* \* \*